United States Patent [19]

Clarke et al.

[11] 4,007,142
[45] Feb. 8, 1977

[54] AMINE RESIN AND PROCESS

[75] Inventors: Barry John Clarke, Glenhuntly; Robert William Kershaw, South Blackburn; Frederick John Lubbeck, Beaumaris, all of Australia

[73] Assignee: Balm Paints Limited, Melbourne, Australia

[22] Filed: June 9, 1976

[21] Appl. No.: 694,490

Related U.S. Application Data

[63] Continuation of Ser. No. 463,786, April 24, 1974, abandoned.

[52] U.S. Cl. .............................. 260/2.5 F; 162/166; 260/2.5 B; 260/2.5 M; 260/15; 260/39 R; 260/851
[51] Int. Cl.² ...................... C08J 9/24; C08J 9/26
[58] Field of Search ...................... 260/2.5 F, 2.5 B

[56] References Cited

UNITED STATES PATENTS

| | | | |
|---|---|---|---|
| 3,371,053 | 2/1968 | Raskin | 260/2.5 B |
| 3,585,149 | 6/1971 | Vassiliades | 260/2.5 B |

*Primary Examiner*—Morton Foelak
*Attorney, Agent, or Firm*—Cushman, Darby & Cushman

[57] ABSTRACT

As new compositions, retiporous amine resin granules of at least 10% pore volume, the pores having a minimum average diameter of about 0.1 micron. A process of preparing the granules from a dispersion of a hardenable amine syrup and their use in paints, polymer and paper as texturing and matting agents are also disclosed.

14 Claims, No Drawings

AMINE RESIN AND PROCESS

This is a continuation of application Ser. No. 463,786 filed Apr. 24, 1974, now abandonded.

This invention relates to spheroidal amine resin granules, to a process for producing them and to their use in coating compositions.

It has been proposed to prepare addition polymers of monomers such as propylene, styrene, acrylic and vinyl esters in the form of granules and to use such granules in surface coatings and plastics. For example insoluble polymer granules may be used to impart a texturing effect to surface coatings or to modify certain physical properties such as hardness and toughness, of surface coatings films or plastics. These granules may be prepared by, for example, the mechanical reduction of bulk polymer. It has also been proposed that when the granules are suitably vesiculated, that is they have a cell-like structure comprising discrete cells or vesicles of vapour, the walls of which are provided by the polymer, their presence in, for example, surface coating films, polymer and paper imparts thereto an opacifying effect.

We have now discovered that certain condensation resins of the class known in the art as amine resins may be prepared in granular form to which a particular internal structure, which we know as a retiporous structure, has been imparted and that such granules may also be used as matting and opacifying agents. These granules, due to their inherent insolubility in most polymers and liquids used in coatings and plastics technology, are particularly well suited to such applications.

By a retiporous structure we mean that there is spread throughout the granule a net-like web of pores or ducts defined by the polymer comprising the granule. The individual pores are not required to be of uniform diameter nor are they necessarily of constant cross-sectional area and shape, although for certain applications their maximum diameter may be important. The actual shape of the pores is imparted by the skeleton of polymer defining them and it is characteristic of the retiporous granules we disclose that this skeleton resembles a mass of irregular, frequently rod-like, fragments of polymer linked together in a lattice-like structure. Alternatively, the individual fragments of polymer within the granules may assume a near spherical shape, the lattice-like structure being built up by the apparent fusion at random points of contact of neighboring spheres. The characteristic net-like web of pores is still clearly visible however, when for example a fractured granule is examined with a scanning electron microscope.

This constrasts with, for example, a cellular polymer in which the cells, although they may to a degree be inter-connected, are essentially discrete cavities within the mass of polymer. The surface of our granules may be a smooth shell of polymer; alternatively it may be pierced by random exposed ends of individual pores. The shell is not necessarily of uniform thickness but may comprise areas where an otherwise exposed pore is sealed by a thin, membrane-like film of polymer.

The pore-like internal structure of the granules of this invention is identifiable under an optical microscope and we have estimated the minimum average diameter to be of the order of 0.1 micron. The useful pore volume is at least 10% of the total granule volume and when used as opacifying agents, from 10–60% of the total granule volume.

Accordingly, we now provide retiporous amine resin granules in which the pore volume is at least 10% of the total granule volume and the pores have a minimum average diameter of about 0.1 micron.

In their simplest form, amine resins are understood in the art to be the condensation products of urea or melamine with formaldehyde and are so-described, for example, in "Paint Technology Manual" No.3, published by the Oil and Colour Chemists' Association (U.K.) It is known, however, that other carbamides, amino-triazines and compounds of similar chemical structure may be used either alone or in combination, for example as partial replacements for urea or melamine, in preparing amine resins. Such alternative or modified condensation product are comprehended in our use of the term amine resins.

The granules may be prepared by the mechanical reduction of bulk retiporous polymer. We have found, however, that this usually results in the formation of a high proportion of elongated or irregularly shaped granules and a high concentration at the granule surface of exposed pore ends. For certain applications, for example where the usage calls for a uniform matting action or the most effective opacifying effects we have found that the granules should be essentially spheroidal in shape and with a minimum of exposed pore ends at their surface; that is the surface of the granules is substantially pore-free. For these applications in particular, we prefer to make the granules directly at the desired size and spheroidal shape by a process disclosed hereinunder.

It is known that melamine or urea, for example, can be pre-reacted with formaldehyde in the presence of an aqueous liquid to produce an aqueous syrup in which precursor elements dispersed in the aqueous liquid are convertible on further condensation reaction to hard, insoluble polymer. The aqueous liquid is essentially water, although it may be necessary or desirable to add to the water a minor proportion of an organic liquid to produce a stable syrup.

We have now found that if a convertible syrup of this type is stably dispersed in a non-aqueous liquid continuous phase in which it is insoluble, in the form of discrete particles of the order of size required in the completed granules, the precursor elements of the syrup may then be condensed to hard polymeric granules of spheroidal shape and with the desired retiporous structure. In order to achieve granules having the desired retiporous structure a limitation must be placed on the minimum aqueous liquid content of the convertible syrup.

Accordingly, we further provide a process of preparing spheroidal retiporous amine resin granules in which the pores have a minimum average diameter of about 0.1 micron by dispersing an aqueous syrup, comprising precursor elements convertible by a condensation reaction to hard amine polymer together with at least 15% by weight of the total weight of syrup of a liquid which is essentially water, as discrete particles in a non-aqueous liquid continuous phase in which the said syrup is insoluble, and then condensing the precursor elements to hard polymer.

The general principles of formulating convertible amine resin syrups are well known to the art and are usually defined in terms of the formaldehyde to carbamide or amino-triazine ratio and the degree of polymerisation achieved at the convertible syrup stage. Broadly, the selection of this component for use in the process we disclose poses no unusual requirements and demands no more than the exercise of known principles of polymer technology. We have found, however, (with the proviso discussed hereinunder) that the best results are given with an aqueous syrup in which conversion of the aqueous syrup to the gel state can be made to proceed rapidly and the resultant polymer is highly cross-linked. In this embodiment of our process, we prefer that condensation of the syrup to the gel stage shall take place in 10 minutes more preferably 5 minutes maximum. We measure this time by observing on a bulk sample of syrup subjected to the same condensation conditions of temperature and catalysis, the interval between the first observable viscosity increase and the onset of gelation. It is known that the rate of cure of an amine syrup depends upon the composition of the reactive constituents of the syrup, reaction temperature and catalyst concentration and type, on which our process places no unusual restrictions. It is therefore neither practical nor necessary to further define them in order that our process may be comprehended. As a general guide, however, a satisfactory convertible syrup is provided by, for example, an aqueous syrup comprising dimethylol urea condensed at pH 6 for 15 minutes at 100° C, the useful range of formaldehyde to urea molar ratios being from 1.9/1 to 2.3/1 while for melamine-formaldehyde resins the corresponding ratios are 2.0/1 to 4.5/1 or even as high as 5.0/1. These ratios are calculated from the composition of the materials from which the cured polymer is made. For example, in the simplest case the ratio is calculated as the weight proportion of formaldehyde to urea used in preparing the precursor elements of the aqueous syrup, which are subsequently converted without further modification (except for the addition of catalyst or activator) to solid amine polymer. However, the art recognises that additions of urea, formaldehyde or even a compound such as monomethylol urea may be made to a simple precursor of this type to provide a suitable convertible syrup. When this is so the initial ratio of formaldehyde to urea is adjusted accordingly in comprehending the above ratios.

A low viscosity of the convertible aqueous syrup appears to favour the formation of small-diameter pores within the completed granules.

Although, as mentioned above, it is frequently desirable to use a convertible syrup with a short gel time, we have further discovered that when working with urea-formaldehyde type compositions in particular, satisfactory retiporous granules can be prepared even when the syrup has inherently a much longer get time, e.g. 1-1½ hours, by adding to the syrup a minor amount, typically less than 1% by weight, of a soluble poly(vinyl alcohol). A particularly useful material of this type is a poly(vinyl alcohol) containing about 20% by weight of unhydrolysed vinyl acetate units and with a weight average molecular weight of the order of 125,000. The use of poly(vinyl alcohol) is not confined solely to slow-curing syrups, however. It has been observed that similar additions to some fast-curing syrups can, at times, have an advantageous effect on the uniformity and size of pores in the granules formed therefrom.

The aqueous liquid content of the convertible syrup has an important bearing on the nature of amine resin granules prepared therefrom. For example, although a retiporous structure has been detected in granules prepared from syrups in which the aqueous liquid content is over 15% by weight but less than 20%, in general the pore size is then much finer than 0.1 micron. It is also possible to prepare retiporous granules from aqueous syrups containing greater than 55% by weight of aqueous liquid, for example up to 75% by weight, but for most purposes the granules prepared therefrom are too fragile to be useful. We prefer, therefore, to limit the aqueous liquid content of our aqueous syrups to 20–55% by weight. Similar criteria apply when the syrup is to be converted to bulk retiporous polymer which is subsequently mechanically reduced to granular form.

The non-aqueous liquid in which the convertible syrup is to be dispersed must be a non-solvent for and chemically inert toward the precursor elements of the convertible syrup and the granules. In general, this will mean that the non-aqueous liquid is incompatible with the convertible syrup. For example the liquid may be an essentially aliphatic hydrocarbon such as heptane, hexane or a commercial mixture of hydrocarbons, e.g. petroleum ether and white spirits.

The non-aqueous liquid may comprise other liquids, for example aromatic hydrocarbons, e.g. toluene, xylene and petroleum naphthas and it may, in fact, be necessary to use a proportion of these or other liquids when the non-aqueous liquid contains a dissolved polymer, to maintain the polymer in solution. It is not essential, however, that the non-aqueous liquid be completely insoluble in the convertible syrup provided it does not dissolve the reactive constituents and cause them to pass into the continuous phase of the dispersion. For example there may be present in the non-aqueous liquid a proportion of a liquid which has a measurable solubility in the aqueous syrup, e.g. to maintain the solubility of a selected polymer in the continuous phase. When this is so, a proportion of the soluble liquid may partition into the aqueous syrup. This is not objectionable provided due regard is taken of the altered reactive constituents content of the convertible syrup in the subsequent condensation reaction of the process. Conversely, if a proportion of the aqueous liquid partitions into the continuous phase, this can be allowed for in a similar manner; or a compensating adjustment made to the solids content of the convertible syrup.

Alternatively, the non-aqueous liquid may be a solution in a liquid of the above type of a polymer. This can have important practical results. For example, the addition of a soluble polymer to the non-aqueous liquid usually enables smaller particles to be prepared. While there are no inherent limitations on the upper diameter of the granules which can be prepared by our process, the use of a dissolved polymer in the continuous phase is often desirable or even essential to prepare granules of, for example, less than 50 micron diameter. For example retiporous granules of about 20 micron diameter are most advantageously prepared in a non-aqueous liquid containing dissolved therein about 30% by weight of dissolved polymer. Furthermore, it may be necessary to increase the dissolved polymer concentration to 45% or even as high as 65% by weight to prepare granules of the order of 3 micron diameter. When the dissolved polymer is, for example, an oil modified alkyd resin, a secondary effect related to the free carboxyl groups of the resin may also be observed. It would appear that at a given resin solids content the achievable granule size tends to decrease as the acid value of the resin increases.

Other resins which may be dissolved in the continuous phase are, for example, chlorinated rubber and copolymers of vinyl chloride.

The dispersion is prepared by adding aqueous convertible syrup to the mechanically agitated liquid continuous phase. The diameter of the disperse particles is controlled by known techniques, utilising time and rate of agitation and the relative viscosities of the continuous and disperse phases to arrive at the required disperse particle diameters. Optionally the stable water-in-oil type dispersion may be achieved by the use of surface-active agents which favour this type of dispersion, e.g. sorbitan monooleate, at a typical concentration of 4% by weight or less. When this is done, it may be unnecessary to use a dissolved polymer in the liquid continuous phase.

Condensation of the disperse syrup particles to hard polymer is induced by adding a suitable catalyst or activator, for example a mineral acid, e.g. hydrochloric acid, to the dispersion. The activator may be added prior to, during or after formation of the initial dispersion. Optionally the dispersion may be heated to accelerate the reaction. The granules formed by the condensation reaction may be retained for use as a slurry in the non-aqueous liquid or separated from it and dried to provide the granules themselves. Condensation of an aqueous syrup to bulk retiporous polymer is carried out in a similar manner.

The pore size of the granules, as described above, is not necessarily uniform nor is each individual pore necessarily of uniform diameter or cross-sectional shape along its length. For all practical purposes, however, we have found it satisfactory to define the retiporous structure in terms of the total pore volume of the granule as measured, for example, by a mercury porosimeter and to give an average pore diameter estimated from electron micrographs of the granules. When used as opacifying materials we have achieved the best results when the pore volume of the granules is from 10–60% of the granule volume and the pores have an average diameter of about 0.2 – 0.5 micron.

In the process described above the pore volume of the granules is related to the solids content of the convertible aqueous syrup, the lower the solids of the syrup the greater the ultimate pore volume. The pore volume is not necessarily, however, directly proportional to the liquid content of the aqueous syrup. Faster reaction rates in condensing the syrup favour finer pore sizes.

The retiporous granules we have described are useful as texturing and matting agents in paints and plastics. We have also found that when they are incorporated in such media or, for example, in paper, they have an opacifying effect on the compositions. This opacity appears to be due to the light-scattering effect of the porous passages within the granules and if so would be expected to be lost if they became irreversibly filled with the medium in which they are embedded, e.g. polymer or surface coating binder. However, it is a particular and surprising feature of these granules, especially when they are prepared by the preferred process described above, that this apparent limitation on their usefulness has not been met with in practice.

We believe, without so-limiting the invention, that this observed effect is associated with the inherently hydrophilic nature of the polymer and our ability, particularly in the preferred process of making the granules, to limit the pore diameter to a size which allows ingress of relatively low molecular weight materials but effectively blocks the passage of larger molecules. Provided the admitted material is sufficiently volatile, a retiporous vapour-filled structure is restored in the dried granule-containing composition. For example if the granules are mixed into a typical paint vehicle comprising a solution of a film-forming polymer in a volatile liquid and a film of the mixture cast on a glass plate, the film is at first clear, but on drying in air it gradually acquires a significant degree of opacity, as the volatile liquid evaporates.

This effect is illustrated by the following experiment. Portions of approximately 20 micron diameter urea/formaldehyde retiporous granules prepared according to the process of the invention were added separately to a number of liquids, the resulting pastes being spread as thin films on glass panels and allowed to dry. The opacity of the films was judged by eye while they were wet and after drying, with the following results:

| Liquid | Appearance of Film | |
|---|---|---|
| | Wet | Dry |
| water | semi-transparent | opaque |
| ethylene glycol | transparent | opaque |
| glycerol | opaque | (non-drying: became transparent after standing for 14 days) |
| commercial acrylic copolymer aqueous latex | semi-transparent | opaque |
| commercial alkyd resin solution in xylene | opaque | opaque |
| commercial acrylic lacquer solution | opaque | opaque |
| xylene | opaque | opaque |

Observation of granules under a microscope during the drying stage revealed that the ability of a granule to scatter light returned as it dried, spreading rapidly from an initial point at its surface to permeate the granule as a whole. This is consistent with our description of the structure of a retiporous granule.

It will be evident from the above description that retiporous granules of this type provide a convenient mechanical means of separating dissimilar liquids, for example to remove traces of impurities of water from petrol.

The opacifying effect of the retiporous granules can be further increased by incorporating pigment in them. This is done by dispersing a prime-pigment, e.g. titanium dioxide, into the convertible syrup before preparation of the granules. We have observed, using as little as 5% by weight of titanium dioxide based on the total granule weight, remarkable gains in opacity of paint films in which the granules were incorporated, the opacity substantially exceeding that which was predicted from the weight of titanium oxide present in the film.

Alternatively a proportion of an extender pigment, e.g. barytes, aluminium silicate and whiting, may be incorporated into the granules in a similar manner to, for example, modify their mechanical properties.

When used as low-density fillers and opacifiers in plastics mouldings, polymer films and paper, we prefer to use the granules in proportions of up to 75% by volume of the compositions. When so-used as fillers the retiporous granules preferably have a diameter of 50 micron maximum, their opacifying effect being greatest at diameters of up to 5 micron.

Furthermore, they are particularly useful as matt texturing, flatting and opacifying agents in paint compositions. Granules having a mean diameter of 50 to 500 micron or more can be used to obtain texturing effects in paint films while, in general, if the mean particle diameters of the granules lie within the range of 1 to 100 micron the texturing effect is less pronounced and the granules can be used to obtain an opacifying and matting effect in matt and semi-matt paints. For the best results in matt paints, especially matt aqueous latex paints, we prefer that the granules should be essentially of from 1 to 50 micron diameter and with a volume average diameter of from 5 to 35 micron. The volume average diameter is defined by the expression $$\Sigma V^i d^i$$

where $V^i$ is the volume fraction of all particles of diameter $d^i$.

Matt paints comprising granules of lower volume average diameter than 5 micron tend to exhibit glossiness in the applied paint film and if the volume average diameter exceeds 50 micron the surface appearance of the film is marred by coarse particles which disrupt the otherwise uniform matt surface.

Granules with a diameter within the range of 0.1 to 5 micron are particularly useful in gloss and semi-gloss paints in which their opacifying property can be used to good effect. In contrast to the use of conventional opacifying pigments this opacity is gained without significantly increasing the density of the film which, for some applications in particular, e.g. paper coatings, can be an important advantage. It is an important feature of this embodiment of our invention that when the retiporous polymer granules are suitably sized they can be used to opacify a glossy paint film without detracting from its surface gloss; typically at granule diameters of less than 1 micron. On the other hand, by the choice of somewhat coarser granules both the opacity and surface gloss of the compositions can be controlled in a predictable manner; the coarser the granules the lower the achievable gloss.

Furthermore, because the granules and the paint film-forming polymer may have different physical characteristics, the granules can be used to regulate the overall mechanical properties of a film in which they are incorporated. For example, the use of the relatively hard cross-linked retiporous granules prepared according to the invention can be used to increase the hardness and abrasion resistance of a film.

The paints may be prepared by stirring the granules into a conventional paint formulation compriising film-forming polymer and optionally pigment, typically to a maximum granule volume concentration based on the total solids of the paint of 55% in gloss and semi-gloss paints, while for matt paints the granule volume concentration may be as high as 95%.

The invention is illustrated by the following examples in which all parts are expressed by weight.

EXAMPLE 1

Preparation of retiporous spheroidal polymer granules by the condensation of an aqueous syrup of a low molecular weight urea/formaldehyde condensate precursor (formaldehyde/urea molar ratio 2.2/1), the aqueous syrup being dispersed as discrete particles in a 27% by weight hydrocarbon solution of an oil-modified alkyd resin.

The convertible aqueous syrup was prepared by heating the following mixture of reflux for 10 minutes:

| | |
|---|---|
| water | 400 parts |
| potassium hydroxide | 2 parts |
| paraformaldehyde (80% formaldehyde content) | 330 parts |
| urea | 240 parts |

The mixture was then cooled to 70° C, 20 parts of nitric acid (1.16 molar) added, refluxing resumed for a further 15 minutes, 17 parts of a 12% by weight aqueous solution of potassium hydroxide added and the syrup cooled.

Condensation and granulation of the aqueous syrup was carried out by rapidly dispersing 150 parts of the above syrup mixed with 10 parts of nitric acid (1.16 molar) into 180 parts of a 27% by weight solution of a 50% safflower oil modified alkyd resin in white spirits, the acid value of the resin being 8 mgm. KOH per gm. The disperse aqueous syrup gelled in 3 minutes at ambient temperature. The granules so-prepared showed a characteristic retiporous structure under the microscope, had an average diameter of approximately 20 micron a measured porosity of 56% of the total granule volume and an average pore diameter of the order of 0.3 micron.

Similar results were obtained when the above process was repeated, but replacing the 10 parts of nitric acid used in the granulation and condensation stage with 7 parts of hydrochloric acid (1.16 molar). It was observed that this lengthened the gel time to 6 minutes.

EXAMPLE 2

Preparation of retiporous urea/formaldehyde resin granules using the convertible aqueous of example 1 but replacing the alkyd resin of that example with a fatty acid ester surface-active agent.

A fatty acid ester surface-active agent was prepared by esterifying 1 mole of di-pentaerithrytol with 3 mole of soya fatty acids at a temperature of 210°–230° C and using lead naphthenate as an esterification catalyst. A 2% by weight solution of this ester in toluene was then prepared.

A convertible aqueous syrup as in example 1 (50 parts) was added with vigorous mechanical stirring to 75 parts of the above solution, in which it formed a stable dispersion of discrete liquid particles. When 12 parts of 1 M nitric acid were added to the dispersion, the disperse syrup particles gelled within 8 minutes to form spheroidal retiporous resin granules of from 10–40 micron diameter with a pore volume of 55% of the total granule volume and an average pore diameter estimated by electron microscope examination to be of the order of 0.2 micron.

EXAMPLE 3

Preparation of retiporous spheroidal urea/formaldehyde granules of formaldehyde/urea molar ratio 2.2/1 by the general method of example 1 but using polymers other than an oil modified alkyd resin in solution in the non-aqueous liquid continuous phase.

Two samples of granules were prepared from the aqueous syrup of example 1 and by the general method of that example and using 6.5 parts of nitric acid (1.16 molar) per 150 parts of convertible syrup as the condensation catalyst. For the first sample, the safflower oil modified alkyd of example 1 was replaced by 300 parts of 25% by weight solution of isomerised rubber in white spirits. The grade of isomerised rubber was such that a 50% by weight solution of it in white spirits had a viscosity of approximately 40 poise. For the second sample, the alkyd resin was replaced by 230 parts of a 30% by weight solution in xylene of a vinyl chloride copolymer. The selected copolymer contained about 25% by weight of vinyl iso-butyl ether and had a viscosity as a 25% by weight solution in xylene of 1 poise.

In each case, the convertible aqueous syrup gelled in about 8 minutes at ambient temperature, the granules formed having an average diameter of about 20 micron, a measured porosity of about 40% by volume and an average pore diameter of the order of 0.3 micron.

EXAMPLE 4

Preparation of small spheroidal retiporous granules of urea/formaldehyde resin by the general method of example 1, but using a more concentrated alkyd resin solution and adding condensation catalyst after forming a dispersion of the convertible syrup in the alkyd resin solution.

A portion of 100 parts of convertible aqueous syrup according to example 1 was added with vigorous mechanical stirring to 120 parts of a 30% by weight solution of the alkyd resin of example 1 in white spirits. Stirring was continued until the disperse particles had a diameter of about 1 micron, when 20 parts of nitric acid (2 molar) were added. The disperse particles gelled in about 3 minutes at ambient temperature, the solidified granules having an average diameter of about 1 micron, measured porosity of 20% by volume and an average pore diameter of the order of 0.3 micron.

EXAMPLE 5

Preparation of retiporous spheroidal urea/formaldehyde granules by the general method of example 1 but using a convertible aqueous syrup of higher active component content. The granules have a lower porosity than those of example 1.

A convertible syrup was prepared by heating the following mixture to reflux for 10 minutes:

| | |
|---|---|
| Water | 200 parts |
| potassium hydroxide | 2 parts |
| paraformaldehyde (80%) | 330 parts |
| urea | 240 parts |

The mixture was then cooled to 70° C, 18 parts of nitric acid (1.16 molar) added, refluxing resumed for 15 minutes, 17 parts of a 12% by weight aqueous solution of potassium hydroxide added and the syrup cooled.

By the general method of example 1 granules were prepared from the above syrup, using as condensation catalyst 9 parts of nitric acid (1.16 molar) per. 150 parts of convertible aqueous syrup. The disperse syrup particles gelled in 8 minutes at ambient temperature.

The retiporous granules so-prepared were of about 20 micron diameter, had a porosity of 37% by volume and a very fine pore structure, with an average pore diameter of the order of 0.1 micron.

EXAMPLE 6

Preparation of retiporous urea/formaldehyde granules in which the polymer of the granules is pigmented.

A convertible aqueous syrup was prepared according to example 1 and then pigmented by dispersing 25 parts of rutile titanium dioxide pigment into 225 parts of the syrup, using a high-speed mechanical stirrer. The pigmented syrup was catalysed by the addition of 13 parts of hydrochloric acid (1.034 molar) and then rapidly dispersed with agitation in 200 parts of a 25% by weight solution in white spirits of the alkyd resin of example 1. The disperse particles gelled in 5 minutes at ambient temperature.

The retiporous pigmented granules so-formed had an average diameter of 15 micron, a measured porosity of 50% by volume and an average pore diameter of about 0.4 micron.

EXAMPLE 7

Preparation of retiporous granules of urea/formaldehyde resin similar to example 1 but in which the precursor polymer has a higher molecular weight.

The granules were prepared by the method described for example 1 except for an increase in the nitric acid content of the syrup preparation from 20 parts to 24 parts. The higher viscosity of the aqueous syrup compared with that of example 1 was attributed to the higher molecular weight polymeric precursor formed.

The disperse aqueous syrup gelled in 7 minutes, compared with the 3 minutes of example 1 and the measured porosity was 50% by volume compared with 56% by volume porosity shown by the granules of example 1. Average granule diameter was 20 micron and the average pore diameter of the order of 0.1 micron.

EXAMPLE 8

Preparation of retiporous granules of melamine/formaldehyde resin. The formaldehyde/melamine molar ratio is 4/1.

A convertible aqueous syrup was prepared by heating the following mixture at reflux for 30 minutes and then cooling:

| | |
|---|---|
| water | 280.0 parts |
| potassium hydroxide | 0.5 parts |
| paraformaldehyde (80%) | 300.00 parts |
| melamine | 252.0 parts |

A mixture of 300 parts of the above convertible syrup and 24 parts of hydrochloric acid (1.0 molar) parts was added with vigorous stirring to 300 parts of a 31% by weight solution of a 36% linseed oil modified rosin modified alkyd resin in toluene to form a stable dispersion.

The dispersion so-formed was heated to 55° C for 40 minutes to gel the disperse convertible syrup, forming retiporous granules of 15 micron average diameter, with a porosity of about 18% by volume and an average pore diameter of about 1.5 micron.

EXAMPLE 9

Preparation of non-aqueous coating compositions comprising retiporous polymer granules.

A mixture of 9.0 parts of pigment grade rutile titanium dioxide, 4.06 parts of a 40% by weight solution of a commercial medium oil length air-drying alkyd resin in white spirits, 0.50 parts of mineral turpentine was mixed for 30 minutes with a high-shear mechanical stirrer to make a white mill-base. To this mill-base was added 33.4 parts of a slurry of granules of retiporous polymer and mixing continued for a further 10 minutes, to provide a paint composition comprising retiporous polymer granules. The preparation was carried out five times, using in each case a different slurry of retiporous granules selected as shown below. The slurries were the end-products of the corresponding examples, it having being found unnecessary to separate the granules from their associated non-aqueous liquids for the preparation of these coating compositions.

| Paint No. | Granules slurry from example No. | Avg, granules dia. in micron | Relative order of film opacities |
|---|---|---|---|
| 9a | 1 | 20 | 2 |
| 9b | 2 | 25 | 3 |
| 9c | 5 | 20 | 4 |
| 9d | 6 | 15 | 1 |
| 9e | 7 | 20 | 5 |

Films of each paint were applied by brush to Morest opacity charts at a spreading rate of approximately 600 sq. ft. per gallon and allowed to dry in air at 25° C and 50% relative humidity. All paints gave coherent, uniformly matt dry films. The films were rated visually for opacity with the results shown above.

By way of comparison, a series of control paints was prepared by the above method but replacing the retiporous granules with pore-free granules of the same average particle diameters. In each case the test paint comprising retiporous granules gave a dry film of substantially higher opacity than the corresponding paint comprising pore-free granules.

EXAMPLE 10

Preparation of aqueous and non-aqueous coating compositions comprising retiporous polymer granules. The granules are washed and dried prior to their incorporation in the compositions.

Granule slurries from examples 1, 4 and 8 were diluted with a large volume of xylene, allowed to settle, concentrated by decanting and dried in air.

Using conventional high-speed mixer dispersion techniques and taking each of the above samples of granules in turn, three non-aqueous and three aqueous coating compositions were prepared to the following general formulae:

| Alkyd enamel: | |
|---|---|
| dry granules | 16.5 parts |
| alkyd resin solution (as for example 9) | 31.6 parts |
| rutile titanium dioxide | 18.0 parts |
| dimethyldiotadecyl ammonium salt of montmorillonite | 1.0 part |
| mineral turpentine | 10.0 parts |
| Aqueous latex paint: | |
| dried granules | 12.0 parts |
| water | 50.0 parts |
| rutile titanium dioxide | 12.9 parts |
| sodium hexametaphosphate | 0.1 part |
| acrylic latex* | 16.7 parts |
| hydroxyethyl cellulose | 0.2 parts |

*a commercial fine particle-size acrylic copolymer latex of 47% by weight solids content.

The completed paints were tested as in example 9 and compared with control paints as described in that example. All samples dried to hard, coherent films, the compositions comprising granules of examples 1 and 8 producing matt films, while those comprising granules of example 4 were of a higher, semi-gloss appearance. The opacity of the dried film in each case was usefully greater than that of its corresponding control.

EXAMPLE 11

This example illustrates the preparation of paper containing vesiculated granules.

A sample of long-fibre wood pulp (10 parts) was mixed with water (190 parts) and the pulp beaten with a laboratory beater until uniform. A slurry comprising 0.5 parts of retiporous granules obtained by washing the granules of example 1 with xylene, decanting, drying in air and re-slurrying in 1.5 parts of water, was added and the beating process continued for a further 15 minutes. The slurry was further diluted with water (800 parts) and then fed into a paper-making machine.

The dry paper obtained had higher opacity than a similar composition in which the retiporous granules had been omitted.

EXAMPLE 12

This example illustrates the preparation of a sheet of polyethylene containing retiporous granules.

Polyethylene granules (98 parts) were blended with dry retiporous granules (2 parts) prepared as described above from the granules of example 1. To fully incorporate the granules the mixture was extruded in the form of a tube, and fed into a granulator. The product was then extruded in the form of an opaque sheet of 1 mm thickness. By comparison with a sheet of untreated polyethylene the sheet as prepared above was relatively opaque.

EXAMPLE 13

The effect of additions of a poly(vinyl alcohol) to an aqueous convertible syrup on the nature of vesiculated granules prepared therefrom is demonstrated.

An aqueous urea/formaldehyde syrup (formaldehyde/urea ratio 3/1) was prepared by the general method of example 1.

An aqueous solution of a substantially monomethylol urea was prepared by the following method. A mixture of 37.5 parts of paraformaldehyde (80% by weight formaldehyde content) and 102.5 parts of water was adjusted to a pH of 8 by the addition thereto of a dilute solution of potassium hydroxide and heated to 80° C until the paraformaldehyde dissolved. The solution was then cooled to 60° C, 60 parts of urea added and the temperature once more raised to 80° C until the urea dissolved.

To 9 parts of the monomethylol urea solution was added 14 parts of the above aqueous syrup, the temperature adjusted to 50° C and the pH to 5.5 by the addition of 1 M hydrochloric acid. After 15 minutes the pH was adjusted with dilute aqueous potassium hydroxide solution to a pH of 7.5 and the solution allowed to cool to room temperature; to provide an aqueous convertible syrup.

Vesiculated granules were then prepared by first activating the above convertible syrup by adjusting its pH to 3 with hydrochloric acid and then immediately dispersing 25 parts thereof with vigorous mechanical agitation in 150 parts of a 33% by weight solution in xylene of a 64% soya oil modified alkyd resin of acid value 12 mgm KOH per gm. The gel time of the syrup tested as described hereinabove was approximately 30 minutes.

The disperse particles of convertible aqueous syrup cured to granules of amine resin which, while generally speroidal and showing some retiporous internal structure, were somewhat irregular in external shape. There was also some evidence of a partial collapse of the retiporous structure.

The above experiment was repeated with the alternation of an addition to the aqueous syrup prior to activation with hydrochloric acid of 2 parts of a 7.5% by weight solution in water of a poly(vinyl alcohol) of weight average molecular weight approximately 115,000 and a residue of about 20% by weight of unhydrolysed acetate groups. The granules so-produced were of about 20 micron mean diameter, spheroidal and with a clearly visible regular retiporous structure. The average pore diameter was estimated to be about 0.1 micron.

By way of comparison, the above experiment was repeated once more but replacing the solution of poly (vinyl alcohol) with 4 parts of a 2.6% by weight solution of hydroxy ethyl cellulose, the grade of which was chosen to give a convertible syrup of approximately the same viscosity as that of the syrup containing poly(vinyl alcohol). The granules prepared from this syrup were similar in shape to those produced from the untreated syrup and lacked the regular spheroidal shape and clearly defined retiporous structure of the granules from the poly(vinyl alcohol) treated syrup.

EXAMPLE 14

Preparation of retiporous granules of melamine/formaldehyde resin, the ratio of formaldehyde/melamine used being 5/1.

A mixture of

| A mixture of | |
|---|---|
| aqueous formaldehyde solution (37% formaldehyde by wt.) | 40.0 parts |
| melamine | 12.6 parts |
| aqueous poly(vinyl alcohol) solution (7½% by wt., grade as example 13) | 5.0 parts | was heated to 75° C with vigorous stirring and held at this temperature for approximately 15 minutes to dissolve the melamine. The pH was approximately 7. The convertible aqueous syrup so-formed was activated by adding to it 0.25 parts of 5M hydrochloric acid, which reduced the pH to about 5.5. The mixture (25 parts) was then dispersed with vigorous mechanical agitation in 150 parts of a 65% by weight solution in xylene of a 64% Soya oil modified alkyd resin of acid value 10–15 mgm KOH per gm. the dispersion so-formed being held at 80° C for 20 minutes to cause the amine resin to condense, forming hard granules. A sample of the activated aqueous syrup had a gel time of about 12 minutes when tested as described hereinabove.

The granules so-formed were of 10–15 micron diameter and showed a retiporous structure in which the pores had an average diameter of about 0.5 micron.

When the example was repeated in the absence of the poly(vinyl alcohol) the granules so-formed were more irregular in shape and had a less clearly defined retiporous structure.

EXAMPLE 15

The results of experiment 14 confirmed our observation that for the best results it is usually desirable to include a poly(vinyl alcohol) addition in the process when preparing melamine/formaldehyde granules. In this example it is shown that if the melamine/formaldehyde syrup is modified by the addition thereto of even a minor proportion of a urea/formaldehyde syrup, the use of poly(vinyl alcohol) may not be necessary to achieve satisfactory retiporous granules.

A mixture of 27.32 parts of paraformaldehyde (80% by weight formaldehyde content) and 30.24 parts of water was adjusted to a pH of 8 with dilute aqueous potassium hydroxide solution and held at 80° C until the paraformaldehyde dissolved, at which time 14.52 parts of urea were added. The mixture was then heated to 100° C, held for 10 minutes at this temperature to dissolve the urea and then cooled to 60° C. The convertible aqueous syrup so-formed was adjusted to pH 3.4 with 1 M hydrochloric acid, re-heated to 100° C and held at this temperature for 15 minutes to form a polymeric precursor. The batch was then adjusted to pH 7.5 with dilute aqueous potassium hydroxide and cooled to room temperature, to provide a convertible aqueous urea/formaldehyde syrup.

| A blend of: | |
|---|---|
| 37% by weight aqueous formaldehyde | 40.0 parts |
| melamine | 12.6 parts |
| urea/formaldehyde syrup(above) | 5.0 parts | was heated to 75° C with vigorous stirring and held at this temperature until the melamine dissolved. The convertible syrup so-formed (pH about 7) was then activated by adjusting the pH to 5.5 by the addition of 5 M hydrochloric acid and immediately dispersed with vigorous mechanical stirring in a 33% by weight solution in xylene of a 64% Soya oil modified alkyd resin of acid value 14.5 mgm KOH per gm., pre-heated to 80° C. The dispersion of particles of convertible aqueous syrup in the alkyd resin solution was maintained, with constant mechanical stirring, at 80° C for a further 20 minutes to cause the condensation of the precursor elements in the syrup to hard amine polymer. A sample of activated aqueous syrup when tested as hereinabove described and at 80° C had a gel time of 8 minutes.

The disperse particles formed discrete hard retiporous amine resin granules of about 15 micron diameter and exhibiting a well-defined retiporous structure. The average pore size was of the order of 0.6 micron.

EXAMPLE 16

Effect of average pore diameter of retiporous amine granules on the hiding power of paint films in which the granules are incorporated.

By the general method described in example 1 an aqueous urea/formaldehyde (formaldehyde/urea ratio of 3/1) syrup was prepared. Three portions of this syrup were then blended with varying amounts of a solution of monomethylol urea to give convertible syrups which when tested as hereinabove described had the gel times shown in the accompanying table. Each syrup was processed to hard, retiporous granules of about 15 micron diameter using the general method of example 1. The granules were dried in a stream of warm air and compounded into paints of the following formula by conventional latex paint dispersion methods, the granules being incorporated last, by stirring, after the other ingredients had been dispersed to a homogeneous paint base:

| | |
|---|---|
| water | 105.30 parts |
| hydroxyethyl cellulose | 0.50 parts |
| titanium dioxide | 26.60 parts |
| sodium hexametaphosphate | 0.08 parts |
| pigment dispersant* | 1.70 parts |
| vinyl copolymer latex* | 83.30 parts |
| retiporous resin granules | 25.00 parts |

*The pigment dispersant used was a conventional commercial anionic dispersant of undisclosed composition. Its inclusion is not essential to the performance of the example. The vinyl copolymer latex used was a typical commercial vinyl acetate copolymer latex (chemical composition undisclosed but not critical) of about 0.5 micron average particle size and 55% solids by weight.

The paints so-prepared were brushed out onto Morest charts to the same weight of paint per unit surface area and allowed to dry in air. Relative opacity was estimated visually by a number of experienced testers and averaged to give the following results:

| | Granules | | |
|---|---|---|---|
| Paint No. | gel time of syrup | average pore diameter | Relative Opacity* |
| 1 | 2 minutes | 2.00 micron | 5.0 |
| 2 | 7½ minutes | 0.30 micron | 6.5 |
| 3 | 10 minutes | 0.08 micron | 4.0 |

*A relative opacity figure of 12 would represent essentially complete obliteration of the substrate.

The results show that average pore diameters above and below our preferred figures were associated with lower opacity paint films. (Paints 1 and 3 were of lower opacity than paint 2).

EXAMPLE 17

Preparation of bulk retiporous amine polymer and its use in granule form in a paint composition.

A convertible aqueous syrup according to example 1 was activated by adding to it 1.16 M nitric acid (10 parts to 150 parts of syrup). The mixture was then poured into a tray and allowed to condense at ambient temperature to a hard solid. When fractured the solid showed a retiporous internal structure the average pore size of which was of the order of 0.4 micron.

The bulk polymer so-produced was dry crushed in a laboratory reduction mill and screened to give powdered granules substantially of from 10–25 micron diameter. The granules were roughly spheroidal but contained a proportion of somewhat irregularly shaped pieces.

These granules were processed into a paint by the method described in example 9 then tested as described therein. The dry paint film was coherent and matt but less opaque and mechanically weaker than a film similarly prepared from the spheroidal retiporous granules of example 1.

We claim:

1. Granules consisting essentially of hard, insoluble amine resin selected from the group consisting of urea-formaldehyde and melamine-formaldehyde resins, said granules having a retiporous structure in that there is spread throughout the granules a net-like web of non-cellular pores or ducts defined by the polymer comprising the granules and further characterized in that the pore volume is from 10–60% of the total granule volume and the pores have an average diameter of about 0.2–0.5 micron, said granules being essentially spheroidal in shape and having an essentially pore-free surface, said granules having a lattice-like structure being built-up by the fusion at random points of contact of neighboring particles.

2. Granules as set forth in claim 1 in which said neighboring particles are spheres.

3. Polymer containing dispersed therein up to 75% by volume of retiporous amine resin granules according to claim 1.

4. Paper containing dispersed therein up to 75% by volume of retiporous amine resin granules according to claim 1.

5. Paint compositions comprising as flatting or texturing agents retiporous amine resin granules according to claim 1.

6. Paint compositions according to claim 5 in which the paints are matt paints, the retiporous amine resin granules are essentially of from 1 to 50 micron diameter and with a volume average diameter of from 5 to 35 micron.

7. Retiporous amine resin granules according to claim 1 in which pigment is incorporated therein.

8. A process of preparing granules of hard, insoluble amine resin selected from the group consisting of urea-formaldehyde and melamine-formaldehyde resins, said granules having a retiporous structure in that there is spread throughout the granules a net-like web of non-cellular pores or ducts defined by the polymer comprising the granules, the pores having an average diameter of about 0.2–0.5 micron, wherein an aqueous syrup consisting essentially of water and a urea-formaldehyde or melamine-formaldehyde condensate which is convertible on further condensation to said hard insoluble amine resin, said syrup comprising 20–55% by weight of water, is dispersed as discrete particles in a non-aqueous liquid in which said condensate is insoluble and which is chemically inert to said convertible condensate and then condensing the said hard condensate through a cross-linking gelling reaction to hard polymer.

9. A process according to claim 8 in which condensation of the aqueous syrup to the gel stage takes place in 10 minutes maximum.

10. A process according to claim 8 in which the condensation takes place in 5 minutes maximum.

11. A process according to claim 8 in which there is added to the aqueous syrup a minor amount of a poly(vinyl alcohol) soluble therein.

12. A process according to claim 8 in which the concentration in the aqueous syrup of liquid which is essentially water is 20–55% by weight.

13. A process according to claim 8 in which a polymer is dissolved in the non-aqueous liquid continuous phase.

14. A process according to claim 8 in which the dispersion of discrete particles of aqueous syrup in a non-aqueous liquid comprises up to 4% by weight of a water-in-oil type surface-active agent.

* * * * *